Sept. 13, 1949.　　　G. R. ANDERSON ET AL　　　2,481,897
DEVICE FOR SEPARATING LEAVES, STEMS,
AND OTHER MATERIAL FROM HOPS Filed March 2, 1948　　　3 Sheets-Sheet 1

INVENTORS
George R. Anderson
Zack Anderson

Sept. 13, 1949.　　　G. R. ANDERSON ET AL　　　2,481,897
DEVICE FOR SEPARATING LEAVES, STEMS,
AND OTHER MATERIAL FROM HOPS
Filed March 2, 1948　　　　　　　　　　　　3 Sheets-Sheet 2

INVENTORS
George R. Anderson
Zack Anderson

INVENTORS
George R. Anderson
Zack Anderson

Patented Sept. 13, 1949

2,481,897

UNITED STATES PATENT OFFICE 2,481,897

DEVICE FOR SEPARATING LEAVES, STEMS, AND OTHER MATERIAL FROM HOPS

George R. Anderson and Zack Anderson, Santa Rosa, Calif.; said Zack Anderson assignor to said George R. Anderson Application March 2, 1948, Serial No. 12,566

5 Claims. (Cl. 209—12)

This invention pertains to separators and particularly to a machine for separating leaves, stems, and other material from hops.

Hops are raised on a trellis fourteen to sixteen feet high. In the past, when mature, the vines were cut loose from the trellis and the hops were picked from the vines by hand. Due to the shortness of the season and the great amount of hand labor required, an improved method of picking was needed. Such a need resulted in the introduction of the art of picking hops by machine. Today the art of machine picking is widely practiced although some hand picking is still done.

When picked by machine the vines are usually cut off several feet above the ground and cut loose from the trellis. They are then hauled to the picking machine in instances where the machine is stationary. The usual picking machine consists of two horizontal rows of revolving drums with one row disposed above the other. The drums in each row are placed parallel to one another and approximately one quarter of a drum diameter apart. The drums carry a plurality of picking fingers, which are V shaped. In operation the vines are secured at one end to a grasper bar which pulls the vines over the top row of the revolving drums and then between the top and lower rows of the drums. The picking fingers comb the vines and engage and pull off hops from the vines.

In the combing action, which picks the hops from the vines, a great many leaves and stems are picked and broken from the vines. These leaves and stems must be removed from the hops to make a suitable market grade. An urgent need exists for a separator of new and novel design which will be capable of efficiently delivering a clean grade of hops without sacrificing any of the hops.

The present invention relates to a machine for separating the hops from the leaves, stems, and other material more efficiently than has heretofore been accomplished. Due to novel features of the machine the separating action is positive and precise. These novel features also enable the machine to accomplish precise results under varying hop-crop conditions.

Condition of the hop crop changes as the season progresses. Crop conditions also vary from year to year. A machine that can perform the cleaning operation precisely under the variable conditions mentioned above is greatly needed by the hop growing industry.

Novel means are provided for the positive carrying of the leaves, stems, and other material into the discharge. Further novelty is provided in the variable control of the suction effect and its ability to handle varying crop conditions. Other advantages will appear in the following specification and the novel features of the invention will be particularly pointed out in the appended claims.

Provided is a pervious belt supported and driven by pulleys. The belt is disposed at a suitable angle. Disposed under the belt is an air housing in which is mounted an axial flow fan. It should be pointed out that other suitable means for producing a suction effect could be used. The fan maintains a suction upon the belt causing leaves, stems, and other material to adhere to the belt. The hops, being heavier and fairly round in shape, roll down and off the belt. The inlet area of the fan is divided into two parts by a partition extending from the upper pulley to the fan thus forming two separate ducts in the air housing. One duct substantially covers the area of the belt. Disposed in this duct between the fan and the belt are a number of baffles. These baffles are adjustable and regulate the amount of suction produced upon the belt. The other duct extends from the fan up to and around the upper pulley, thereby forming an opening above the belt. The leaves adhering to the belt are carried up to this opening and are sucked in by the suction current maintained in this duct. Means are provided to adjust the angle of the belt so as to insure rolling and gravity separation of the hops from the leaves, stems, and other material.

The present invention is illustrated in the accompanying drawings forming a part of the application in which—

While only the preferred form of the invention is shown, it should be understood that various changes or modifications may be made within the scope of the appended claims, without departing from the spirit of the invention.

The invention will be carried out by first identifying the various parts and describing their arrangement, then by showing their functions in conjunction with one another to achieve a comprehensive presentation of the separating operation.

Figure 1:
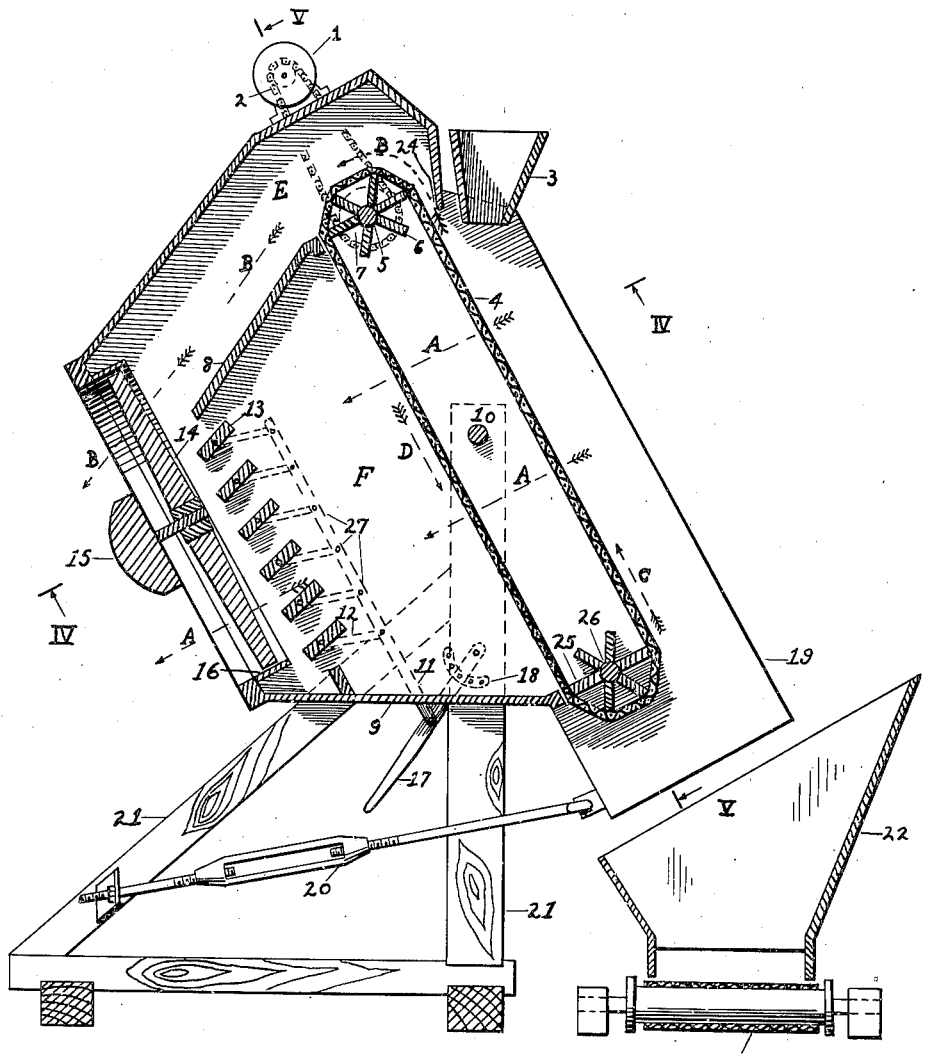
Fig. 1 is a central vertical section of the separating machine.
Figure 2:
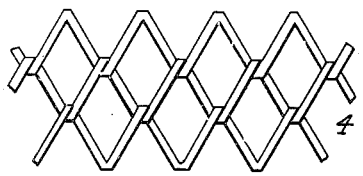
Fig. 2 is an enlarged view of a portion of the pervious separator belt.
Figure 3:
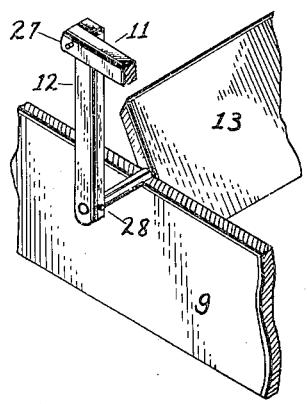
Fig. 3 is a perspective view of portions of the housing, baffles and baffle control levers.
Figure 5:
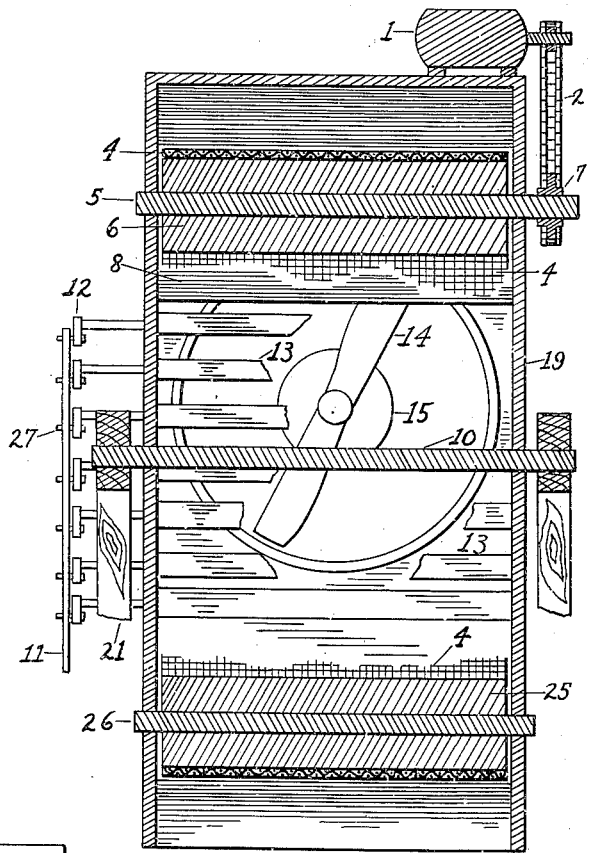
Fig. 5 is a cross section taken on line V—V.
Figure 4:
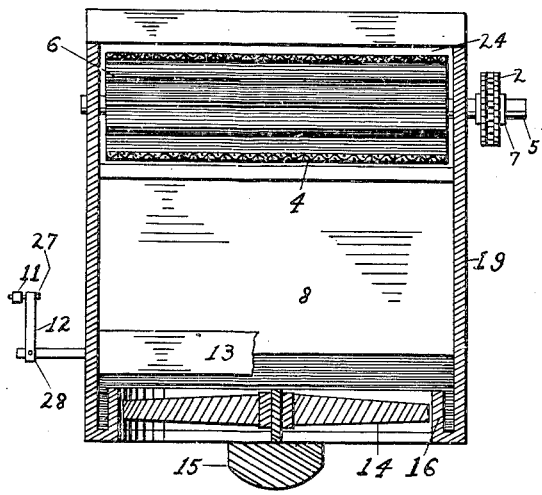
Fig. 4 is a cross section taken on line IV—IV.
Figure 6:
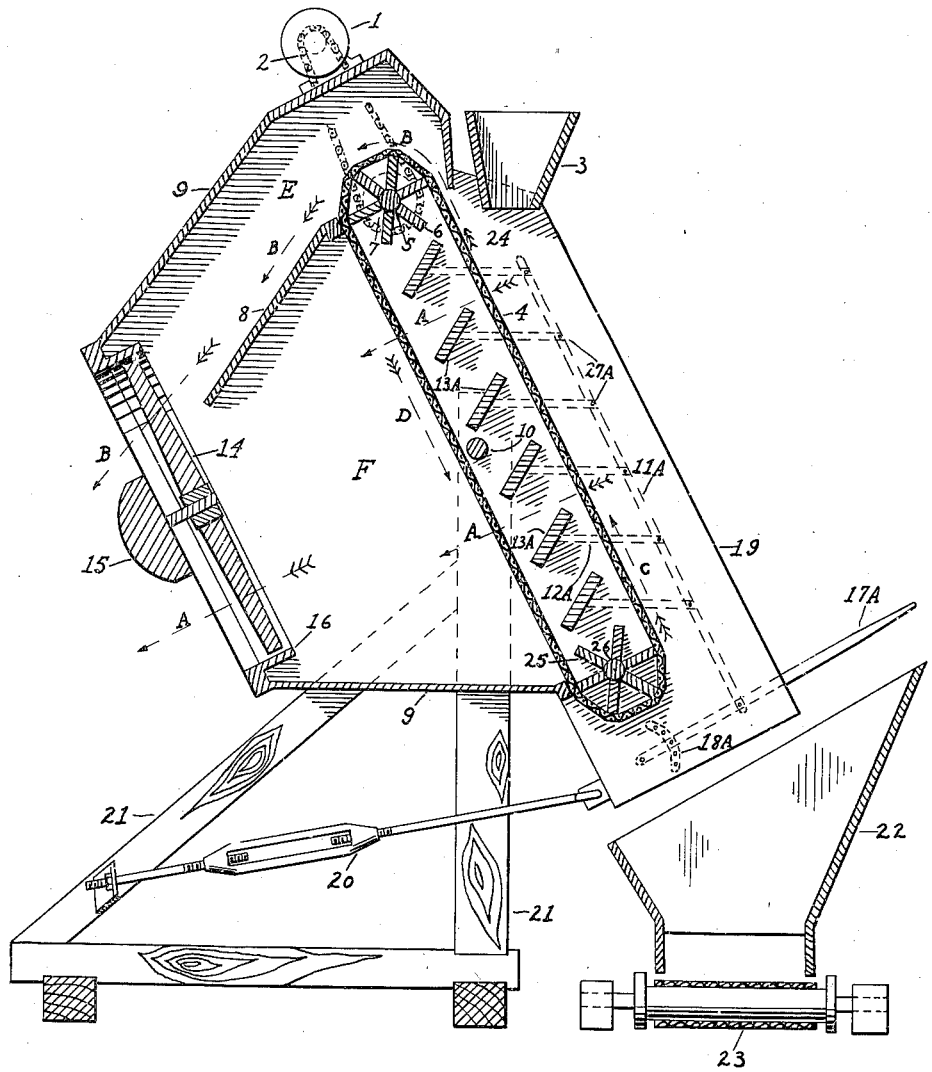
Fig. 6 is a central vertical view of the separating machine similar to Fig. 1 but showing alternate arrangement of baffles.

Referring to the drawings, in detail with emphasis on Figure 1: A gear motor 1 (other suitable driving means may be used) is mounted on the separator frame 19 and drives the chain 2, which in turn drives the sprocket 1. The sprocket 7 is carried on shaft 5 which, with the shaft 26, are journaled in the frame 19. Shafts 5 and 26 carry a number of spiders 6, 25 forming pulleys which support the belt 4. Shaft 5 drives the belt 4 through its pulley, and shaft 26 and its pulley are revolved by the belt 4. A part of the frame 19 is designated as an air housing 9. Placed across the housing 9 is the partition 8 to form two air ducts. The ducts are designated as E and F. The frame 19 with housing 9 are carried pivotly on shaft 10 which is mounted in supporting frame 21. Mounted in the housing 9 or in the frame 19 are the baffles 13 or 13a connected by levers 11 or 11a and 12 or 12a to the general control lever 17 or 17a. Also mounted on the rear of the housing 9 are the fan 14, fan motor 15 and fan housing 16. A locking device 18 or 18a is provided for general control lever 17 or 17a. A device 20 to adjust the inclination of the frame 19, housing 9 and the belt 4 in frame 21 is provided. A hopper 3 directs hops, leaves, stems, and other material to the machine. A hopper 22 directs cleaned hops to the conveyor 23. 24 is the opening for the air duct formed by the partition 8. 27 or 27a is a pivot pin in the levers 11 or 11a and 12 or 12a. 28 is a set screw in lever 12 or 12a connected to baffle 13 or 13a and provides for adjusting the position of baffle 13 or 13a relative to lever 12 or 12a.

Two general methods of operation may be employed with the invention. It should be borne in mind that a number of intermediate phases of operation exist between the two general methods. The first general method shall be designated as one in which the hop cones roll down and off the belt by gravity. The second method shall be one in which the hop cones fall in air, in front of the belt.

In the first method the belt 4 is driven in the direction shown by arrows C and D. This is accomplished by the gear motor 1 driving the shaft 5 through the chain 2 and sprocket 7. Means for producing a suction upon the belt 4 are provided by the fan 14 and motor 15. The partition 8 divides the suction current of the fan 14 into two distinct parts, one current which flows through the belt 4 designated as A, the other current which flows through the duct E designated as B. It will be noted that the opening 24 is small in area compared to the opening of the duct E at the fan 14. This causes a relatively strong suction at opening 24. The amount of suction upon the belt 4 is regulated by the baffles 13 or 13a and their control levers 11 or 11a, 12 or 12a, 17 or 17a. The hop cones, leaves, stems, and other material are introduced through the hopper 3. They then fall on to the belt 4 near its upper portion. The suction on belt 4 is regulated so that it causes leaves, stems, and other material to adhere to the belt 4. The hop cones being heavier and fairly round in shape, roll down and off the belt 4 to hopper 22. Hop cones are not held to the belt 4 because the suction is limited by the baffles 13 or 13a to such an extent that it is not strong enough to cause hop cones to adhere to the belt 4. Furthermore the inclination of belt 4 is adjusted to an angle which shall insure the proper rolling action of the hop cones. The belt 4 has a vibrating action caused by the use of spider pulleys 6 and 25 instead of conventional type pulley. This vibrating action assists hop cones which otherwise may have tended to adhere to the belt 4 to roll. The leaves, stems, and other material which adhere to the belt 4 are carried by the belt up to the opening 24. Here the stronger suction current B seizes them and they are carried into the duct E and thence, through the fan to discharge. The cleaned hop cones fall into hopper 22 and are directed to the conveyor.

In the second method of operation the belt 4 is adjusted to a relatively steeper inclination than in the first method. The hopper 3 is moved out from the belt 4 a little beyond the vertical projection of a plane passed through the lower extremity of belt 4. The baffles 13 or 13a are adjusted individually relative to levers 11 or 11a and 17 or 17a by the set screws 28. The baffles are adjusted so that the baffle nearest partition 8 is open the greatest amount. The baffles are adjusted so the openings gradually diminish, the smallest opening being furthest from partition 8. It can be seen that the suction on belt 4 will be stronger at the upper portion diminishing in strength to the lower extremity. General control of the suction as a whole can still be obtained through lever 17 or 17a but to a more limited extent than in the first method. Hop cones, leaves, stems and other material are introduced through the hopper 3 and fall in front of the belt 4. The suction through belt 4 being stronger at the top, exerts a relatively strong force on the leaves, stems, and other material causing them to curve towards the belt 4. As they continue falling the suction, although diminishing in strength, causes them to curve towards the belt 4 until they adhere thereto. The hop cones being heavier, are not acted upon by the suction as much as the leaves. For this reason the hop cones fall free of the belt 4 and are directed onto the conveyor by the hopper 22. In case it is desired to allow the hop cones to fall upon the belt 4 somewhere on its lower extremity this may be done. To accomplish satisfactory separation under this condition the baffles are adjusted so that the suction on the lower extremity of the belt is insufficient to cause hop cones to adhere to the belt.

It can be seen that the operation could be one of a number of compromises between the two general methods of operation described.

Having thus described our invention, what we claim and desire to secure by Letters Patent is:

1. A machine for separating hops from leaves, stems, and other material, consisting of an endless pervious belt mounted on pulleys positioned to maintain the belt at an angle between horizontal and vertical, the uppermost of the relatively flat sections of the belt extending between the pulleys traveling in an upward direction, the belt being driven by at least one of the pulleys, means for directing hops, leaves, stems and other material to the upwardly traveling belt section, an air housing means disposed under the belt and extending from pulley to pulley and partially enclosing the upper pulley, an air intake means between the upwardly traveling belt section and the air housing near the upper pulley, and said housing also extending to close the sides of the traveling belt sections, causing the air entering the air housing to enter in part through the air intake near the upper pulley and causing all the rest of said air entering said air housing to enter by passing through the traveling belt sections, an axial flow fan and air outlet means disposed in the air housing, means provided to cause rotation of the fan to produce air suction at the air intake near the upper pulley and also upon the traveling belt sections, baffles disposed between the upwardly and downwardly traveling belt sections.

2. A machine for separating hops from leaves, stems, and other material, consisting of an endless pervious belt mounted on pulleys positioned to maintain the belt at an angle between horizontal and vertical, the uppermost of the relatively flat sections of the belt extending between the pulleys traveling in an upward direction, the belt being driven by at least one of the pulleys, means for directing hops, leaves, stems and other material to the upwardly traveling belt section, an air housing means disposed under the belt and extending from pulley to pulley and partially enclosing the upper pulley, an intake means between the upwardly traveling belt section and the air housing near the upper pulley, said air housing also extending to close the sides of the traveling belt sections causing the air entering the air housing to enter in part through the air intake near the upper pulley and causing all the rest of said air entering said air housing to enter by passing through the traveling belt sections, an axial flow fan and air outlet means disposed in the air housing, a partition placed within and across the air housing so as to extend from the upper pulley to the fan, two air ducts thus being formed within the air housing, each duct having an opening over part of the inlet area of the fan, means provided to cause rotation of the fan to produce air suction in the two air ducts and thereby at the air intake near the upper pulley and also upon the traveling belt sections, baffles disposed between the upwardly and downwardly traveling belt sections.

3. A machine for separating hops from leaves, stems and other material, consisting of an endless pervious belt mounted on pulleys positioned to maintain the belt at an angle between horizontal and vertical, the uppermost of the relatively flat sections of the belt extending between the pulleys traveling in an upward direction, the belt being driven by at least one of the pulleys, means for directing hops, leaves, stems, and other material to the upwardly traveling belt section, an air housing means disposed under the belt and extending from pulley to pulley, and partially enclosing the upper pulley, an air intake means between the upwardly traveling belt section and the air housing near the upper pulley, said air housing also extending to close the sides of the traveling belt sections causing the air entering the air housing to enter in part through the air intake near the upper pulley and causing all the rest of said air entering said air housing to enter by passing through the traveling belt sections, an axial flow fan and air outlet means disposed in the air housing, a partition placed within and across the air housing so as to extend from the upper pulley to the fan, two air ducts thus being formed within the air housing, each duct having an opening over part of the inlet area of the fan, means provided to cause rotation of the fan to produce air suction in the two air ducts and thereby at the air intake near the upper pulley and also upon the traveling belt sections, baffles disposed in the air duct extending from the traveling belt sections to the fan, said baffles being disposed in said duct between the fan and the traveling belt sections.

4. A machine for separating hops from leaves, stems, and other material, consisting of an endless pervious belt mounted on pulleys positioned to maintain the belt at an angle between horizontal and vertical, the uppermost of the relatively flat sections of the belt extending between the pulleys traveling in an upward direction, the belt being driven by at least one of the pulleys, means for directing hops, leaves, stems, and other material to the upwardly traveling belt section, an air housing means disposed under the belt and extending from pulley to pulley and partially enclosing the upper pulley, an air intake means between the upwardly traveling belt section and the air housing near the upper pulley, said air housing also extending to close the sides of the traveling belt sections causing the air entering the air housing to enter in part through the air intake near the upper pulley, and causing all the rest of said air entering said air housing to enter by passing through the traveling belt sections, an axial flow fan and air outlet means disposed in the air housing, a partition placed within and across the air housing so as to extend from the upper pulley to the fan, two air ducts thus being formed within the air housing, each duct having an opening over part of the inlet area of the fan, means provided to cause rotation of the fan to produce air suction in the two air ducts and thereby at the air intake near the upper pulley and also upon the traveling belt sections, individually and collectively adjustable baffles disposed between the upwardly and downwardly traveling belt sections, the portions of the air housing closing the sides of the traveling belt sections constructed so as to form a frame, a shaft mounted in a suitable support, said frame being mounted pivotly on said shaft, suitable means for changing the inclination of said pivoted frame thereby changing the inclination of the belt, in the various changes of the belt said air housing, air ducts, fan, and baffles are maintained in their respective positions relative to the belt, the pulleys supporting the belt consisting of a number of spaced arms extending radially from the pulley core, said arms also extending parallel to the pulley core the width of said pulleys.

5. A machine for separating hops from leaves, stems, and other material, consisting of an endless pervious belt mounted on pulleys positioned to maintain the belt at an angle between horizontal and vertical, the uppermost of the relatively flat sections of the belt extending between the pulleys traveling in an upward direction, the belt being driven by at least one of the pulleys, means for directing hops, leaves, stems and other material to the upwardly traveling belt section, an air housing means disposed under the belt and extending from pulley to pulley and partially enclosing the upper pulley, an air intake means between the upwardly traveling belt section and the air housing near the upper pulley, said air housing also extending to close the sides of the traveling belt sections causing the air entering the air housing to enter in part through the air intake near the upper pulley and causing all the rest of said air entering said air housing to enter by passing through the traveling belt sections, an axial flow fan and air outlet means disposed in the air housing, a partition placed within and across the air housing so as to extend from the upper pulley to the fan, two air ducts thus being formed within the air housing, each duct having an opening over part of the inlet area of the fan, means provided to cause rotation of the fan to produce air suction in the two air ducts and thereby at the air intake near the upper pulley and also upon the traveling belt sections, individually and collectively adjustable baffles disposed in the air duct extending from the traveling belt sections to the fan, said baffles being disposed in said duct between the fan and the traveling belt sections, the portions of the air housing closing the sides of the traveling belt sections constructed so as to form a frame, a shaft mounted in a suitable support, said frame being mounted pivotly on said shaft, suitable means for changing the inclination of said pivoted frame thereby changing the inclination of the belt, in the various changes of the belt said air housing, air ducts, fan, and baffles are maintained in their respective positions relative to the belt, the pulleys supporting the belt consisting of a number of spaced arms extending radially from the pulley core, said arms also extending parallel to the pulley core the width of said pulleys.

GEORGE R. ANDERSON.
ZACK ANDERSON.

REFERENCES CITED

The following references are of record in the file of this patent:

UNITED STATES PATENTS

| Number | Name | Date |
|---|---|---|
| 2,114,727 | Thys | Apr. 19, 1938 |
| 2,210,103 | Stoner | Aug. 6, 1940 |
| 2,226,009 | Miller | Dec. 24, 1940 |